United States Patent [19]

McCready et al.

[11] Patent Number: 4,556,688

[45] Date of Patent: Dec. 3, 1985

[54] THERMOPLASTIC POLYETHERIMIDE ESTER ELASTOMERS

[75] Inventors: Russell J. McCready; John A. Tyrell, both of Mt. Vernon, Ind.

[73] Assignee: General Electric Company, Pittsfield, Mass.

[21] Appl. No.: 691,028

[22] Filed: Jan. 11, 1985

Related U.S. Application Data

[63] Continuation-in-part of Ser. No. 665,277, Oct. 26, 1984.

[51] Int. Cl.$^4$ .................. C08G 63/76; C08L 67/00
[52] U.S. Cl. .................................. 525/33; 525/43; 525/437; 528/288; 528/296
[58] Field of Search ............... 525/33, 43, 437; 528/288, 296

[56] References Cited

U.S. PATENT DOCUMENTS

| | | | |
|---|---|---|---|
| 3,236,895 | 2/1966 | Lee | 260/584 |
| 3,274,159 | 9/1966 | Kluiber | 260/75 |
| 3,355,427 | 11/1967 | Loncrini | 260/47 |
| 3,461,136 | 8/1969 | Pruckmayr | 260/326 |
| 3,555,113 | 1/1971 | Sattler | 260/858 |
| 3,654,370 | 4/1972 | Yeakey | 260/584 |
| 3,695,929 | 10/1972 | Sattler | 428/383 |
| 3,975,330 | 8/1976 | Suzuki | 528/289 |
| 3,994,853 | 11/1976 | Hindersinn et al. | 525/33 X |
| 4,016,330 | 4/1977 | Laganis | 525/33 X |
| 4,127,553 | 11/1978 | Osada et al. | 260/33.2 |
| 4,230,838 | 10/1980 | Foy et al. | 528/408 |
| 4,307,226 | 12/1981 | Bolon et al. | 528/288 |
| 4,321,341 | 3/1982 | Neuberg et al. | 528/296 X |
| 4,331,786 | 5/1982 | Foy et al. | 528/408 |
| 4,361,680 | 11/1982 | Borg et al. | 525/420 |
| 4,362,861 | 12/1982 | Shen | 528/289 |
| 4,371,692 | 2/1983 | Wolfe, Jr. | 528/289 |
| 4,371,693 | 2/1983 | Wolfe, Jr. | 528/292 |
| 4,390,686 | 6/1983 | Janssen et al. | 528/289 |
| 4,438,240 | 3/1984 | Tanaka et al. | 525/437 X |
| 4,483,975 | 11/1984 | de Jong et al. | 528/288 |
| 4,503,197 | 3/1985 | Speranza et al. | 525/437 |

FOREIGN PATENT DOCUMENTS

| | | |
|---|---|---|
| 1466708 | 1/1966 | France . |
| 1551605 | 1/1968 | France . |
| 2198975 | 5/1974 | France . |

OTHER PUBLICATIONS

Honore, P. et al., "Synthesis and Study of Various Reactive Oligomers and of Poly(Ester-Imide-Ether)s", European Polymer Journal V16, pp. 909-916, 10/12/79.

Texaco Chemical Company, "Jeffamine® Polyoxypropyleneamines", 1978.

"Polyimides", Encyclopedia of Chemical Technology 1971, Supp. vol. 1, pp. 740-773.

*Primary Examiner*—Lucille M. Phynes
*Attorney, Agent, or Firm*—Edward K. Welch, II; William F. Mufatti; John W. Harbour

[57] ABSTRACT

Novel poly(etherimide esters) are prepared by reacting a diol, a dicarboxylic acid, a poly(oxy alkylene) diamine and a tricarboxylic acid having two vicinal carboxyl groups or the anhydride thereof.

21 Claims, No Drawings

THERMOPLASTIC POLYETHERIMIDE ESTER ELASTOMERS

This application is a continuation-in-part of copending patent application Ser. No. 665,277 filed Oct. 26, 1984.

The present invention relates to novel thermoplastic elastomers having excellent stress-strain properties, low tensile set, high melting temperatures and/or excellent strength/toughness characteristics as well as superior flexibility which are especially suitable for molding and extrusion applications. Specifically, novel polyetherimide esters having the above-mentioned properties have been prepared from one or more diols, one or more dicarboxylic acids, one or more polyoxyalkylene diamines and one or more tricarboxylic components.

Polyether ester imides are well known having been described in numerous publications and patents including for example, Honore et al, "Synthesis and Study of Various Reactive Oligmers and of Poly(ester-imide-ether)s, *European Polymer Journal* Vol. 16, pp. 909–916, Oct. 12, 1979; and in Kluiber et al, U.S. Pat. No. 3,274,159 and Wolfe Jr., U.S. Pat. Nos. 4,371,692 and 4,371,693, respectively. However, none of the prior art references teach or suggest the novel poly(etherimide ester) compositions of the present invention. Furthermore, none of these references provide polyetherimide ester resins having the excellent physical properties, including high melting point and excellent flexibility, as mentioned above, combined with the rapid crystallization rate and excellent moldability characteristics of the novel polyetherimide esters of the present invention.

Specifically, applicants have now found a novel class of poly(etherimide ester) elastomers which are particularly suited for molding and/or extrusion applications and which are characterized as having one or more of the following enhanced properties: stress-strain resistance, toughness/strength, and tensile set at low flexural modulus combined with rapid crystallization rates and excellent moldability as demonstrated by short cycle times and good mold releasability, respectively.

The novel poly(etherimide esters) of the present invention may be either random or block and are prepared by conventional processes from (a) one or more diols, (b) one or more dicarboxylic acids, (c) one or more polyoxyalkylene diamines and (d) a tricarboxylic acid or derivative thereof containing two vicinal carboxyl groups or an anhydride group and an additional carboxyl group which must be esterifiable and preferably is non-imidizable. Preferred compositions encompassed by the present invention may be prepared from (a) one or more $C_2$–$C_{15}$ aliphatic and/or cycloaliphatic diols, (b) one or more $C_4$–$C_{16}$ aliphatic, cycloaliphatic and/or aromatic dicarboxylic acids or ester derivatives thereof (c) one or more polyoxyalkylene diamines having a molecular weight of from about 600 to about 12000, and (d) a tricarboxylic acid or derivative thereof wherein the anhydride derivative is represented by the formula:

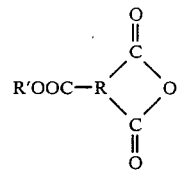

where R is a trivalent organic radical and R' hydrogen or a $C_1$ to $C_6$ aliphatic monovalent organic radical.

The amount by which these reactants are employed and thus incorporated into the polymers of the present invention is dependent to a large extent on the properties desired in the resultant copolyetherimide ester. In general, the amount of reactants (c) and (d) used will be such that the weight ratio of polyoxyalkylene diimide diacid prepared therefrom to the amount of dicarboxylic acid (b) would be from about 0.25 to 2.0, preferably from about 0.4 to about 1.4. Finally, the compositions may contain and preferably do contain stabilizers for greater stabilization and/or low temperature impact strength.

DETAILED DESCRIPTION

The polymers of the present invention comprise the reaction product of (a) a diol, (b) a dicarboxylic acid, (c) a high molecular weight polyoxyalkylene diamine and (d) a tricarboxylic acid or derivative thereof.

Suitable diols (a) for use in preparing the compositions of the present invention include saturated and unsaturated aliphatic and cycloaliphatic dihydroxy compounds as well as aromatic dihydroxy compounds. These diols are preferably of a low molecular weight, i.e. having a molecular weight of about 300 or less. When used herein, the term "diols" and "low molecular weight diols" should be construed to include equivalent ester forming derivatives thereof, provided, however, that the molecular weight requirement pertains to the diol only and not to its derivatives. Exemplary of ester forming derivatives there may be given the acetates of the diols as well as for example ethylene oxide or ethylene carbonate for ethylene glycol.

Preferred saturated and unsaturated aliphatic and cycloaliphatic diols are those having from about 2 to 19 carbon atoms. Exemplary of these diols there may be given ethylene glycol; propanediol; butanediol; pentanediol; 2-methyl propanediol; 2,2-dimethyl propanediol; hexanediol; decanediol; 2-octyl undecanediol; 1,2-, 1,3- and 1,4- dihydroxy cyclohexane; 1,2-, 1,3- and 1,4-cyclohexane dimethanol; butenediol; hexenediol, etc. Especially preferred are 1,4-butanediol and mixtures thereof with hexanediol or butenediol, most preferably 1,4-butanediol.

Aromatic diols suitable for use in the practice of the present invention are generally those having from 6 to about 19 carbon atoms. Included among the aromatic dihydroxy compounds are resorcinol; hydroquinone; 1,5-dihydroxy napthalene; 4,4'-dihydroxy diphenyl; bis(p-hydroxy phenyl)methane and 2,2-bis(p-hydroxy phenyl) propane.

Especially preferred diols are the saturated aliphatic diols, mixtures thereof and mixtures of a saturated diol(s) with an unsaturated diol(s), wherein each diol contains from 2 to about 8 carbon atoms. Where more than one diol is employed, it is preferred that at least about 60 mole %, based on the total diol content, be the same diol, most preferably at least 80 mole %. As mentioned above, the preferred compositions are those in which 1,4- butanediol is present in a predominant amount, most preferably when 1,4-butanediol is the only diol.

Dicarboxylic acids (b) which are suitable for use in the practice of the present invention are aliphatic, cycloaliphatic, and/or aromatic dicarboxylic acids. These acids are preferably of a low molecular weight, i.e., having a molecular weight of less than about 300; however, higher molecular weight dicarboxylic acids, especially dimer acids, may also be used. The term "dicarboxylic acids" as used herein, includes equivalents of dicarboxylic acids having two functional carboxyl groups which perform substantially like dicarboxylic acids in reaction with glycols and diols in forming polyester polymers. These equivalents include esters and ester-forming derivatives, such as acid halides and anhydrides. The molecular weight preference, mentioned above, pertains to the acid and not to its equivalent ester or ester-forming derivative. Thus, an ester of a dicarboxylic acid having a molecular weight greater than 300 or an acid equivalent of a dicarboxylic acid having a molecular weight greater than 300 are included provided the acid has a molecular weight below about 300. Additionally, the dicarboxylic acids may contain any substituent group(s) or combinations which do not substantially interfere with the polymer formation and use of the polymer of this invention.

Aliphatic dicarboxylic acids, as the term is used herein, refers to carboxylic acids having two carboxyl groups each of which is attached to a saturated carbon atom. If the carbon atom to which the carboxyl group is attached is saturated and is in a ring, the acid is cycloaliphatic.

Aromatic dicarboxylic acids, as the term is used herein, are dicarboxylic acids having two carboxyl groups each of which is attached to a carbon atom in an isolated or fused benzene ring system. It is not necessary that both functional carboxyl groups be attached to the same aromatic ring and where more than one ring is present, they can be joined by aliphatic or aromatic divalent radicals or divalent radicals such as —O— or —SO$_2$—.

Representative aliphatic and cycloaliphatic acids which can be used for this invention are sebacic acid, 1,2-cyclohexane dicarboxylic acid; 1,3-cyclohexane dicarboxylic acid; 1,4-cyclohexane dicarboxylic acid; adipic acid; glutaric acid; succinic acid; oxalic acid; azelaic acid; diethylmalonic acid; allylmalonic acid; dimer acid; 4-cyclohexene-1,2- dicarboxylic acid; 2-ethylsuberic acid; tetramethylsuccinic acid; cyclopentanedicarboxylic acid; decahydro-1,5-naphthalene dicarboxylic acid; 4,4'- bicyclohexyl dicarboxylic acid; decahydro-2,6-naphthalene dicarboxylic acid; 4,4 methylenebis(cyclohexane carboxylic acid); 3,4-furan dicarboxylic acid; and 1,1-cyclobutane dicarboxylic acid. Preferred aliphatic acids are cyclohexane dicarboxylic acids, sebacic acid, dimer acid, glutaric acid, azelaic acid and adipic acid.

Representative aromatic dicarboxylic acids which can be used include terephthalic, phthalic and isophthalic acids, bi-benzoic acid, substituted dicarboxy compounds with two benzene nuclei such as bis(p-carboxyphenyl) methane, oxybis(benzoic acid), ethylene-1,2-bis-(p-oxybenzoic acid), 1,5-naphthalene dicarboxylic acid, 2,6-naphthalene dicarboxylic acid, 2,7-naphthalene dicarboxylic acid, phenanthrene dicarboxylic acid, anthracene dicarboxylic acid, 4,4'-sulfonyl dibenzoic acid, and halo and C$_1$-C$_{12}$ alkyl, alkoxy, and aryl ring substitution derivatives thereof. Hydroxy acids such as p($\beta$-hydroxyethoxy)benzoic acid can also be used provided an aromatic dicarboxylic acid is also present.

Preferred dicarboxylic acids for the preparation of the polyetherimide esters of the present invention are the aromatic dicarboxylic acids, mixtures thereof and mixtures of one or more dicarboxylic acid with an aliphatic and/or cycloaliphatic dicarboxylic acid, most preferably the aromatic dicarboxylic acids. Among the aromatic acids, those with 8-16 carbon atoms are preferred, particularly the benzene dicarboxylic acids, i.e., phthalic, terephthalic and isophthalic acids and their dimethyl derivatives. Especially preferred is dimethyl terephthalate.

Finally, where mixtures of dicarboxylic acids are employed in the practice of the present invention, it is preferred that at least about 60 mole %, preferably at least about 80 mole %, based on 100 mole % of dicarboxylic acid (b) be of the same dicarboxylic acid or ester derivative thereof. As mentioned above, the preferred compositions are those in which dimethylterephthalate is the predominant dicarboxylic acid, most preferably when dimethylterephthalate is the only dicarboxylic acid.

The polyoxyalkylene diamines (c) suitable for use in the present invention may be characterized by the following formula:

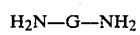

$$H_2N-G-NH_2$$

wherein G is the radical remaining after the removal of the amino groups of a long chain alkylene ether diamine. These polyether diprimary diamines are available commercially from Texaco Chemical Company under the trademark Jeffamine. In general they are prepared by known process for the amination of glycols. For example, they may be prepared by aminating the glycol in the presence of ammonia, Raney nickel catalyst and hydrogen as set forth in Belgium Pat. No. 634,741. Alternatively, they may be prepared by treating the glycol with ammonia and hydrogen over a Nickel-Copper-Chromium catalyst as taught by U.S. Pat. No. 3,654,370. Other methods for the production thereof include as taught in U.S. Pat. Nos. 3,155,728 and 3,236,895 and French Pat. Nos. 1,551,605 and 1,466,708. All the foregoing patents herein incorporated by reference.

The long chain ether glycols suitable for use in the manufacture of the polyoxyalkylene diamines are polymeric glycols having terminal (or as nearly terminal as possible) hydroxy groups and a molecular weight of from about 600 to about 12000. Additionally, the long chain ether glycols will generally have a carbon to oxygen ratio of from about 1.8 to about 4.3.

Representative long chain ether glycols are the poly(alkylene ether) glycols including poly(ethylene ether)glycol; poly(propylene ether)glycol; poly(tetramethylene ether)glycol; random or block copolymers of ethylene oxide and propylene oxide, including propylene oxide and poly(acopylene oxide) terminated poly(ethylene ether) glycol; and random or block copolymers of tetrahydrofuran with minor amounts of a second monomer such as ethylene oxide, propylene oxide, and methyl tetrahydrofuran (used in proportion such that the carbon-to-oxygen mole ratio in the glycol does not exceed about 4.3). Polyformal glycols prepared by reacting formaldehyde with diols such as 1,4-butanediol and 1,5-pentanediol are also useful. Especially preferred poly(alkylene ether)glycols are poly(propylene ether)glycol, poly(tetramethylene ether)glycol and poly(ethylene ether)glycols end capped with poly(propylene ether)glycol and/or propylene oxide.

In general, the polyoxyalkylene diamines useful within the scope of the present invention will have an average molecular of from about 600 to 12000, preferably from about 900 to about 4000.

The tricarboxylic acid (d) may be almost any carboxylic acid anhydride containing an additional carboxylic group or the corresponding acid thereof containing two imide-forming vicinal carboxyl groups in lieu of the anhydride group. Mixtures thereof are also suitable. The additional carboxylic group must be esterifiable and preferably is substantially nonimidizable.

While trimellitic anhydride is preferred as the tricarboxylic component, any of a number of suitable tricarboxylic acid constituents will occur to those skilled in the art including 2,6,7 naphthalene tricarboxylic anhydride; 3,3',4 diphenyl tricarboxylic anhydride; 3,3',4 benzophenone tricarboxylic anhydride; 1,3,4 cyclopentane tricarboxylic anhydride; 2,2',3 diphenyl tricarboxylic anhydride; diphenyl sulfone - 3,3',4 tricarboxylic anhydride, ethylene tricarboxylic anhydride; 1,2,5 naphthalene tricarboxylic anhydride; 1,2,4 butane tricarboxylic anhydride; diphenyl isopropylidene - 3,3',4 tricarboxylic anhydride; 3,4 dicarboxyphenyl 3-carboxylphenyl ether anhydride; 1,3,4 cyclohexane tricarboxylic anhydride; etc. These tricarboxylic acid materials can be characterized by the following formula:

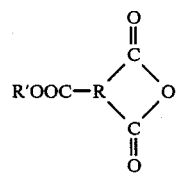

where R is a trivalent organic radical, preferably a $C_2$ to $C_{20}$ aliphatic, aromatic, or cycloaliphatic trivalent organic radical and R' is preferably hydrogen or a monovalent organic radical preferably selected from the group consisting of $C_1$ to $C_6$ aliphatic and/or cycloaliphatic radicals and $C_6$ to $C_{12}$ aromatic radicals, e.g. benzyl; most preferably hydrogen.

The amount by which each of the foregoing reactants is employed in the preparation of the novel polymers of the present invention is not, in general, critical and depends, in part, upon the desired properties of the resultant polymer. Obviously, sufficient amounts of diol versus diacid and tricarboxylic acid versus diamine must be present, as recognized in the art, to allow for substantially complete polymerization.

In general, the amount of diol (a) employed in the practice of the present invention will be a molar excess, preferably about 1.5 molar equivalents, based on the combined molar equivalents of dicarboxylic acid (b) and of the total moles of tricarboxylic acid (d). The amount of tricarboxylic acid (d) employed will preferably be about two molar equivalents based on the number of moles of the polyoxyalkylene diamine (c). Obviously, less than two molar equivalents would result in incomplete imidization of the diamine resulting in potentially poorer properties. Conversely, greater than two molar equivalents of the tricarboxylic acid (d) may lead to cross-linking and branching of the polymer.

Generally, mole relations of 2 moles tricarboxylic acid (d) to 0.85 to 1.15 moles of polyoxyalkylene diamine have been found to yield useful polymers. Finally, the amount by which the dicarboxylic acid (b) and the diamine (c) are used will be such that the weight ratio of the dicarboxylic acid (b) to the theoretical amount of polyoxyalkylene diimide diacid formable from the diamine (c) and tricarboxylic acid (d) will be from about 0.25 to about 2.0, preferably from about 0.4 to about 1.4.

While the amount of diol will directly affect the degree of polymerization achieved in the polymerization process, the weight ratio of dicarboxylic acid to the theoretical yield of polyoxyalkylene diimide diacid will have the greater impact on the properties of the final polymer. The actual weight ratio employed will be dependent upon the specific polyoxyalkylene diimide diacid used and more importantly, the desired physical and chemical properties of the resultant polyetherimide ester. In general, the lower the ratio of polyoxyalkylene diimide diester to dicarboxylic acid the better the strength, crystallization and heat distortion properties of the polymer. Alternatively, the higher the ratio, the better the flexibility, tensile set and low temperature impact characteristics.

In its preferred embodiments, the compositions of the present invention will comprise the reaction product of dimethylterephthalate, optionally with up to 40 mole % of another dicarboxylic acid; 1,4-butanediol, optionally with up to 40 mole % of another saturated or unsaturated aliphatic and/or cycloaliphatic diol; a polyoxyalkylene diamine of molecular weight of from about 600 to about 12000, preferably from about 900 to about 4000, and trimellitic anhydride. In its most preferred embodiments, the diol will be 100 mole % 1,4-butanediol and the dicarboxylic acid 100 mole % dimethylterephthalate.

The novel polyetherimide esters described herein may be prepared by conventional esterification/condensation reactions for the production of polyesters. Exemplary of the processes that may be practiced are as set forth in, for example, U.S. Pat. Nos. 3,023,192; 3,763,109; 3,651,014; 3,663,653 and 3,801,547, herein incorporated by reference. Typically, the reactants will be charged into the reactor vessel and heated to 150° to 260° C. Heating is continued until methanol and/or water evolution is substantially complete. Depending upon the temperature, catalyst and diol excess, this polymerization is complete within a few minutes to a few hours. The low molecular weight prepolymer as produced may subsequently be carried to a high molecular weight polymer by polycondensation. The polycondensation step entails elevating the temperature to between about 240° C. to 300° C. and decreasing the pressure in the reaction vessel to less than about 670 Pa, preferably less than about 250 Pa. During polycondensation excess diol is distilled off and additional ester interchange occurs to build the polymer.

Obviously, it is possible to vary the reaction conditions and the like. Additionally, it is possible to vary the process itself. For example, it is possible to prepolymerize the aromatic dicarboxylic acid (b) and diol (a) and/or preimidize the diamine. Forming the prepolyester of (a) and (b) can be achieved by conventional esterification process as described above as well as in U.S. Pat. Nos. 2,465,319; 3,047,539 and 2,910,466, herein incorporated by reference. Additionally or alternatively, it is possible to preform a diimide diacid or the ester derivatives thereof from the polyoxyalkylene diamine (c) and tricarboxylic acid (d).

Generally, these diimide diacids and the diesters derivatives thereof may be prepared by any of the known methods for the imidization of anhydrides with diamines. Exemplary of the methods include melt synthesis wherein the anhydride and diamine are heated at between about 100° C.–300° C., preferably from about 150°–250° C., while drawing off water, for several hours to produce the diimide. Alternatively, they may be produced by heating in a solvent including, for example, dimethylformamide, diethylformamide, diethylacetamide, N-methylcaprolactam, or dimethylsulfoxide, among others known to those skilled in the art, or in an azeotropic mixture of said solvent with an additional inert solvent, e.g. xylene, and refluxed at between about 100°–300° C., preferably from about 150° C.–250° C., for several hours to form the diimide.

In the process of the present invention, particularly where all the reactants are charged to the reactor together or where the polyoxyalkylene diimide diacid is preformed and excess tricarboxylic acid is present, a minor amount of the tricarboxylic acid or anhydride may react with available hydroxyl groups and ultimately function as a branching agent in the finished polymer. Within limits, the degree of branching in the finished polymer can be controlled by varying the mole ratio of tricarboxylic acid (d) to polyoxyalkylene diamine (c). An excess of diamine reduces the degree of branching, while an excess of the tricarboxylic acid increases branching. In addition to controlling branching by varying the tricarboxylic acid/diamine mole ratio, one can compensate for branching by introducing a monofunctional reactant such as benzoic acid in minor amounts.

With reference to branching, it should be noted that polymers of this invention, when prepared from preformed diimide-diesters, are substantially free of branching. If branching is desired, one needs only to introduce a branching agent, such as trimellitic anhydride, along with the preformed diimide-diester. The amount of branching agent generally will be less than 0.15 moles per mole of diimide diacid or ester thereof. Useful branching agents other than trimellitic anhydride include trimethyl trimellitate, glycerol, trimethylol propane, trimesic acid and its esters and the like.

Additionally, while not required, it is customary and preferred to utilize a catalyst or catalyst system in the process for the production of the polyether imide esters of the present invention. In general, any of the known ester-interchange and polycondensation catalysts may be used. Although two separate catalysts or catalyst systems may be used, one for ester interchange and one for polycondensation, it is preferred, where appropriate, to use one catalyst or catalyst system for both. In those instances where two separate catalysts are used, it is preferred and advantageous to render the ester-interchange catalyst ineffective following the completion of the precondensation reaction by means of known catalyst inhibitors or quenchers, in particular, phosphorus compounds such as phosphoric acid, phosphenic acid, phosphonic acid and the alkyl or aryl esters or salts thereof, in order to increase the thermal stability of the resultant polymer.

Exemplary of the suitable known catalysts there may be given the acetates, carboxylates, hydroxides, oxides, alcoholates or organic complex compounds of zinc, manganese, antimony, cobalt, lead, calcium and the alkali metals insofar as these compounds are soluble in the reaction mixture. Specific examples include, zinc acetate, calcium acetate and combinations thereof with antimony tri-oxide and the like. These catalysts as well as additional useful catalysts are described in U.S. Pat. Nos. 2,465,319; 2,534,028; 2,850,483; 2,892,815; 2,937,160; 2,998,412; 3,047,539; 3,110,693 and 3,385,830, among others, incorporated herein by reference.

Where the reactants and reactions allow, it is preferred to use the titanium catalysts including the inorganic and organic titanium containing catalysts, such as those described in, for example, U.S. Pat. Nos. 2,720,502; 2,727,881; 2,729,619; 2,822,348; 2,906,737; 3,047,515; 3,056,817; 3,056,818; and 3,075,952 among others, incorporated herein by reference. Especially preferred are the organic titanates such as tetra-butyl titanate, tetra-isopropyl titanate and tetra-octyl titanate and the complex titanates derived from alkali or alkaline earth metal alkoxides and titanate esters, most preferably the organic titanates. These too may be used alone or in combination with other catalysts such as for example, zinc acetate, calcium acetate, manganese acetate or antimony trioxide, and/or with a catalyst quencher as described above. The catalyst should be used in amounts of from about 0.005 to about 2.0 percent by weight based on the total reactants.

Both batch and continuous methods can be used for any stage of the ether imide ester polymer preparation. Polycondensation of the polyester prepolymer with the poly(oxy alkylene) diimide diacid can also be accomplished in the solid phase by heating finely divided solid polyester prepolymer with the diimide diacid in a vacuum or in a stream of inert gas to remove liberated low molecular weight diol. This method has the advantage of reducing degradation because it must be used at temperatures below the softening point of the prepolymer. The major disadvantage is the long time required to reach a given degree of polymerization.

Although the copolyetherimide esters of this invention possess good resistance toward heat aging and photodegradation, it is advisable to stabilize these compositions by incorporating therin antioxidants in the copolyester compositions.

Most any oxidative and/or thermal stabilizer known in the art for copolyesters may be used in the practice of the present invention. These can be incorporated into the compositions either during polymerization or while in a hot melt stage following polymerization. Satisfactory stabilizers include the phenols and their derivatives, amines and their derivatives, compounds containing both hydroxyl and amine groups, hydroxyazines, oximes, polymeric phenolic esters and salts of multivalent metals in which the metal is in its lower valence state.

Representative phenol derivatives useful as stabilizers include 3,5-di-tert-butyl-4-hydroxy hydrocinnamic triester with 1,3,5-tris-(2-hydroxyethyl)-s-triazine-2,4,6-(1H,3H,5H)trione N,N'-hexamethylene-bis(3,5-di-tert-butyl-4-hydroxyhydrocinnamamide); 4,4'-bis(2,6-ditertiary-butylphenol); 1,3,5-trimethyl-2,4,6-tris(3,5-ditertiary-butyl-4-hydroxybenzyl)benzene and 4,4'-butylidene-bis(6-tertiary-butyl-m-cresol). Various inorganic metal salts or hydroxides can be used as well as organic complexes such as nickel dibutyl dithiocarbonate, manganous salicylate and copper 3-phenyl-salicylate. Typical amine stabilizers include 4,4-bis(α, α-dimethylbenzyl) diphenylamine, N,N'-bis(betanaphthyl)-p-phenylene diamine; N,N'-bis(1-methylheptyl) -p-phenylene diamine and either phenyl-betanaphthyl amine or its reaction products with aldehydes. Mixtures of hindered phenols with esters of thiodipropionic acid, mercaptides and phosphite esters are particularly useful. Additional stabilization to ultraviolet light can be obtained by compounding with various UV absorbers such as substituted benzophenones and/or benzotriazoles.

Further, the properties of these polyesters can be modified by incorporation of various conventional inorganic fillers such as carbon black, silica gel, alumina, clays and chopped fiberglass. These may be incorporated in amounts up to 50% by weight, preferably up to about 30% by weight. In general, these additives have the effect of increasing the modulus of the material at various elongations.

DETAILED DESCRIPTION OF THE PREFERRED EMBODIMENTS

The following examples are presented as illustrative of the present invention and are not to be construed as limiting thereof.

Into a reactor vessel were placed butanediol, trimellitic anhydride, Jeffamine D2000 (poly(propylene ether) diamine - ave MW 2000) titanate ester catalyst and a phenolic stabilizer. This mixture was allowed to set for approximately one hour until substantially all trimellitic anhydride was dissolved. Thereafter, dimethyl terephthalate was added to the reactor vessel and the mixture heated to about 180° C., whereupon methanol was generated. After the theoretical amount of methanol was generated, approximately one hour or so, the temperature was increased to 250° C. under about 0.5 mm Hg vacuum for about three hours to produce the polyetherimide ester.

The specific compositions and the flexural modulus thereof obtained by the foregoing process were as presented in Table 1.

TABLE 1

|  | 1 | 2 | 3 |
|---|---|---|---|
| Dimethyl terephthalate | 40 | 33 | 46 |
| Butanediol | 30 | 26 | 35.4 |
| Trimellitic Anhydride | 5 | 7 | 3 |
| Jeffamine ® D2000[a] | 24 | 33 | 15 |
| Stabilizer | 1 | 1 | .6 |
| Flexural Modulus, psi × 10$^3$ | 25 | 12.5 | 50 |

[a]poly(propylene ether)diamine from Texaco Chemical Company

The foregoing examples demonstrate that the poly(etherimide esters) may be prepared in a one pot synthesis from a monomer change rather than requiring, as a preliminary step, the imidization of the trimellitic anhydride and poly(oxy alkylene) diamine.

Obviously, other modifications will suggest themselves to those skilled in the art in light of the above, detailed description. All such modifications are within the full intended scope of the present invention as defined by the appended claims.

We claim:
1. A polyetherimide ester composition comprising the reaction product of
(a) one or more diols,
(b) one or more dicarboxylic acids
(c) one or more high molecular weight poly(oxy alkylene) diamines and
(d) one or more tricarboxylic acids or derivatives thereof.

2. The composition of claim 1 wherein the diol component (a) is a $C_2$ to $C_{19}$ aliphatic and/or cycloaliphatic diol or a mixture of diols.

3. The composition of claim 2 wherein at least 60 mole % of the diols are the same.

4. The composition of claim 2 wherein at least 80 mole % of the diols are the same.

5. The composition of claim 4 wherein the predominant diol is 1,4-butanediol.

6. The composition of claim 1 wherein the diol is 1,4 butanediol.

7. The composition of claim 1 wherein the dicarboxylic acid component (b) is selected from the group consisting of $C_2$ to $C_{19}$ aliphatic, cycloaliphatic, and/or aromatic dicarboxylic acids, the ester equivalents thereof and mixtures thereof.

8. The composition of claim 7 wherein at least 60 mole % of the dicarboxylic acids are the same.

9. The composition of claim 7 wherein at least 80 mole % of the dicarboxylic acids are the same.

10. The composition of claim 9 wherein the predominant dicarboxylic acid is dimethyl terephthalate.

11. The composition of claim 1 wherein the dicarboxylic acid is dimethyl terephthalate.

12. The composition of claim 1 wherein the poly(oxy alkylene) diamine is represented by the formula:

$$H_2N-G-NH_2$$

wherein G is the radical remaining after the removal of the amino groups of a long chain alkylene ether diamine and the poly(oxy alkylene) diamine has an average molecular weight of from about 600 to about 12,000.

13. The composition of claim 12 wherein the average molecular weight of the poly(oxy alkylene) diamine is from about 900 to about 4000.

14. The composition of claim 12 wherein the poly(oxy alkylene) diamine is derived from a long chain ether glycol selected from the group consisting of poly(ethylene ether) glycol, poly(propylene ether) glycol, poly(tetramethylene ether) glycol and copoly(propylene ether-ethylene ether) glycol.

15. The composition of claim 14 wherein the long chain ether glycol is poly(propylene ether) glycol.

16. The composition of claim 1 wherein the tricarboxylic acid (d) is characterized by the following formula:

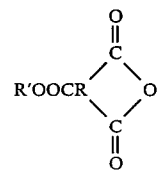

where R is a $C_2$ to $C_{20}$ trivalent aliphatic, cycloaliphatic or aromatic radical and R' is hydrogen or a $C_1$ to $C_6$ aliphatic radical.

17. The composition of claim 16 wherein the tricarboxylic acid component (d) is trimellitic anhydride.

18. The composition of claim 1 wherein the weight ratio of the amount of dicarboxylic acid (b) used to the theoretical amount of poly(oxy alkylene) diimide diacid formable from the diamine (c) and tricarboxylic acid (d) is from about 0.25 to about 2.0.

19. The composition of claim 1 wherein the weight ratio of the amount of dicarboxylic acid (b) to the theoretical amount of poly(oxy alkylene) diimide diacid formable from the diamine (c) and tricarboxylic acid (d) is from about 0.4 to about 1.4.

20. The composition of claim 1 which further comprises a stabilizer.

21. The composition of claim 20 wherein the stabilizer is 3,5-di-tert-butyl-4-hydroxy hydrocinnamic triester with 1,3,5-tris-(2-hydroxy ethyl)-3-triazine-2,4,6-(1H,3H,5H)trione.

* * * * *

UNITED STATES PATENT AND TRADEMARK OFFICE
CERTIFICATE OF CORRECTION

PATENT NO. : 4,556,688

DATED : December 3, 1985

INVENTOR(S) : Russell J. McCready, John A. Tyrell

It is certified that error appears in the above-identified patent and that said Letters Patent are hereby corrected as shown below:

Column 6, line 6, Delete "the dicarboxylic acid (b) to".

Column 6, line 8, Insert -- to the amount of dicarboxylic acid (b) -- after "(d)".

Column 10, line 63, Delete "amount of dicarboxylic acid (b) used to the".

Column 10, line 65, Insert -- to the amount of dicarboxylic acid -- after "d".

Column 10, line 68, Delete "amount of dicarboxylic acid (b) to the".

Column 11, line 2, Insert -- to the amount of dicarboxylic acid (b) -- after "d".

Signed and Sealed this

Seventeenth Day of March, 1987

Attest:

DONALD J. QUIGG

Attesting Officer

Commissioner of Patents and Trademarks